United States Patent
Hying et al.

(10) Patent No.: US 8,378,583 B2
(45) Date of Patent: Feb. 19, 2013

(54) FEEDFORWARD CONTROL OF SEMICONDUCTOR LIGHT SOURCES

(75) Inventors: Ralf Hying, Munich (DE); Peter Niedermeier, Munich (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 328 days.

(21) Appl. No.: 12/665,957

(22) PCT Filed: Jun. 22, 2007

(86) PCT No.: PCT/EP2007/056232
§ 371 (c)(1),
(2), (4) Date: Dec. 22, 2009

(87) PCT Pub. No.: WO2009/000310
PCT Pub. Date: Dec. 31, 2008

(65) Prior Publication Data
US 2010/0176740 A1 Jul. 15, 2010

(51) Int. Cl.
H05B 41/16 (2006.01)
(52) U.S. Cl. .......... 315/287; 315/307; 315/360
(58) Field of Classification Search .......... 315/225, 315/247, 287, 297, 307, 360
See application file for complete search history.

(56) References Cited

U.S. PATENT DOCUMENTS

| | | | |
|---|---|---|---|
| 3,705,316 A | 12/1972 | Burrous et al. | |
| 6,242,870 B1 | 6/2001 | Koyanagi et al. | |
| 6,400,101 B1 | 6/2002 | Biebl et al. | |
| 6,596,977 B2 * | 7/2003 | Muthu et al. | 250/205 |
| 6,734,639 B2 * | 5/2004 | Chang et al. | 315/291 |
| 7,221,104 B2 * | 5/2007 | Lys et al. | 315/291 |
| 7,652,436 B2 * | 1/2010 | Dowling et al. | 315/297 |
| 7,944,153 B2 * | 5/2011 | Greenfeld | 315/291 |
| 2003/0071821 A1 | 4/2003 | Sundahl et al. | |
| 2005/0116921 A1 | 6/2005 | Kim | |
| 2006/0245174 A1 | 11/2006 | Ashdown et al. | |
| 2007/0013322 A1 | 1/2007 | Tripathi et al. | |

FOREIGN PATENT DOCUMENTS

| | | |
|---|---|---|
| DE | 19930174 A1 | 1/2001 |
| EP | 1594346 A2 | 11/2005 |
| FR | 2714564 A1 | 6/1995 |
| WO | 02082416 A1 | 10/2002 |
| WO | 2006126124 A2 | 11/2006 |

OTHER PUBLICATIONS

English abstract for EP1594346A2.
English abstract for FR2714564A1.
English abstract for WO02082416A1.
International Search Report of PCT/EP2007/056232 dated May 8, 2008.

* cited by examiner

*Primary Examiner* — Tung X Le

(57) ABSTRACT

A control method for a semiconductor light source may include operating the semiconductor light source with short, powerful pulses by an operating device; storing the characteristic light decrease of the semiconductor light source depending on the power introduced into the semiconductor light source in the operating device; and altering power introduced during the pulse in such a way that the emitted quantity of light of the semiconductor light source substantially remains constant over the pulse duration.

7 Claims, 3 Drawing Sheets

US 8,378,583 B2

FEEDFORWARD CONTROL OF SEMICONDUCTOR LIGHT SOURCES

RELATED APPLICATIONS

Figure 1:
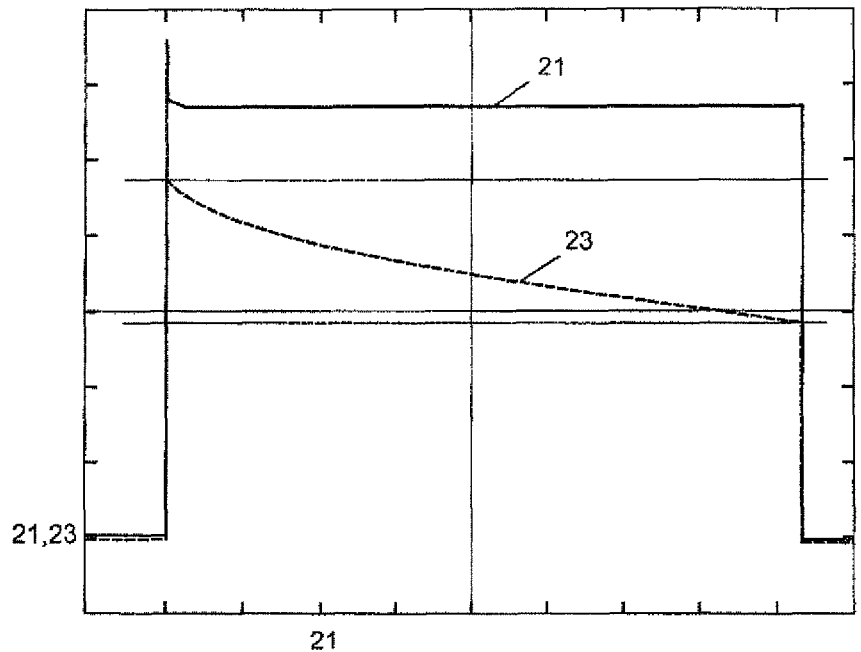

The present application is a national stage entry according to 35 U.S.C. §371 of PCT application No.: PCT/EP2007/056232 filed on Jun. 22, 2007.

BACKGROUND

Various embodiments relate to a control method for semiconductor light sources which is suitable for applications that presuppose a rapid driving of the semiconductor light sources. This is the case in front and rear projection applications for example.

Recently, powerful semiconductor light sources such as high-power light emitting diodes have increasingly been used in applications which had previously been reserved for high-pressure discharge lamps. Precisely in the field of projection, the semiconductor light sources are not driven continuously but rather are operated in pulsed fashion in order to meet the requirements in this field. Very short pulses are employed, which in return have a very high power density.

Since, in present-day semiconductor light sources, the light emission is dependent to a greater or lesser extent on the temperature of semiconductor light sources themselves, a control is necessary which ensures that the quantity of light emitted by a projection unit remains constant. Since pulsed driving methods have only been employed for a short while, the control methods usually used only take account of heating of the semiconductor light sources in relatively large time spans, that is to say over a relatively long period of consideration. As an example, one conventional method can be mentioned in which the temperature of the heat sink or heat sinks connected to the semiconductor light sources is measured, and the driving of the semiconductor light sources is adapted in accordance with the heat sink temperature. This takes account only of long-term effects, but not of the immediate heating of the semiconductor light sources that takes place during driving with short, powerful pulses. Since the pulse pauses can occasionally be very long, the semiconductor light source has enough time to cool down before the next pulse, with the result that the average loading over time does not turn out to be excessively high.

However, the semiconductor light source heats up during such a pulse to such a great extent that the emitted quantity of light does not remain constant during the pulse, but rather decreases continuously. In display applications, this can lead to impairment of the backlighting quality, and hence of the picture quality, and is therefore undesirable.

SUMMARY

Various embodiments specify a control method in which the emitted quantity of light of a semiconductor light source remains constant over the duration of a drive pulse.

Various embodiments specify a circuit arrangement which has implemented the control method according to various embodiments and operates a semiconductor light source in such a way that the emitted quantity of light of the semiconductor light source substantially remains constant over the pulse duration.

SUMMARY

In various embodiments, a control method for semiconductor light sources is proposed in which the characteristic light decrease of a semiconductor light source depending on the power introduced into the semiconductor light source is stored in the operating device, and the operating device varies the power introduced into the semiconductor light source during the pulse duration in such a way that the emitted quantity of light of the semiconductor light source substantially remains constant over the pulse duration.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 measured luminous flux decrease 23 during a pulse with a constant current 21 of approximately 5.7 A.

Figure 2:
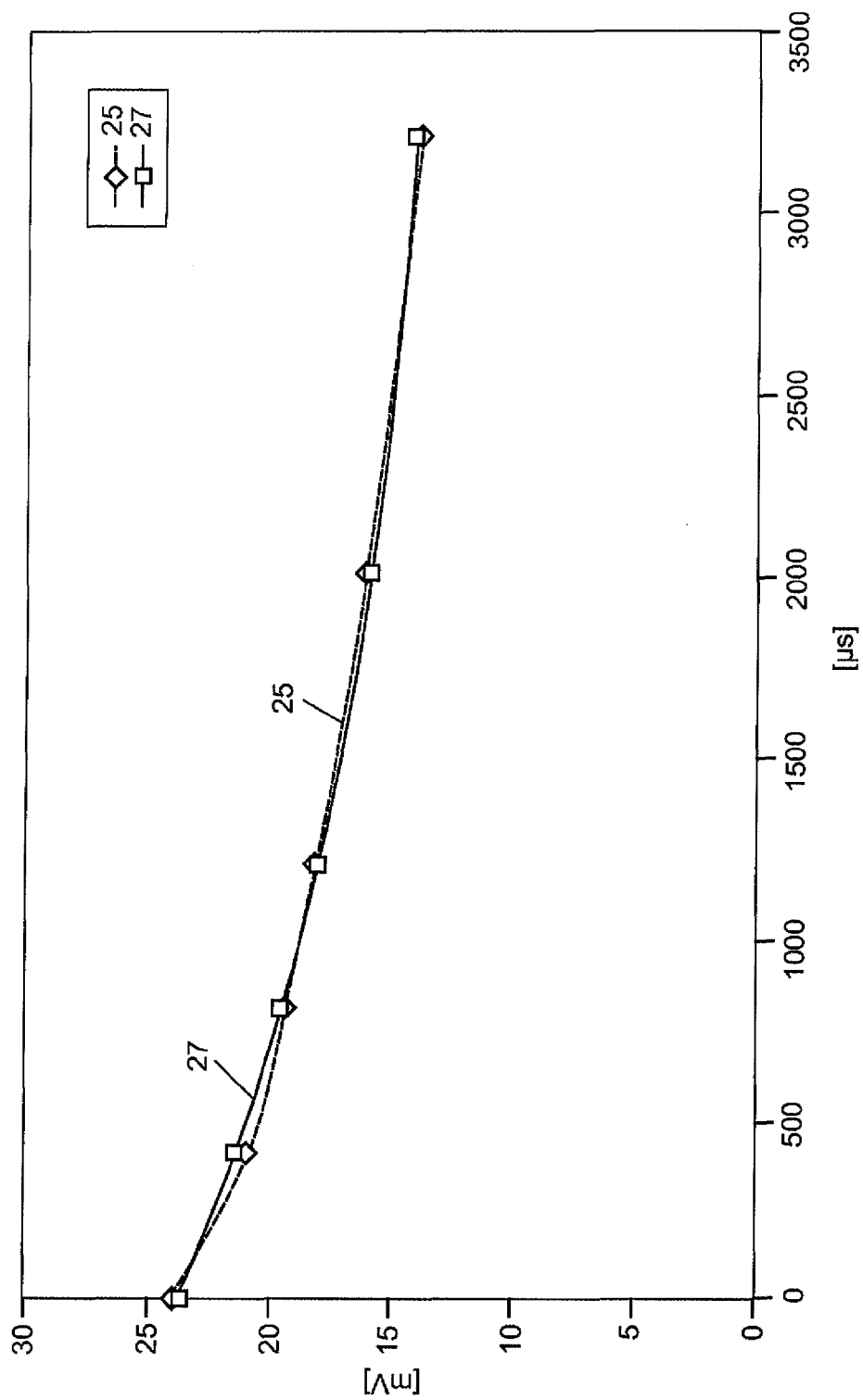

FIG. 2 measured (25) and simulated (27) characteristic luminous flux decrease during a pulse.

Figure 3A:
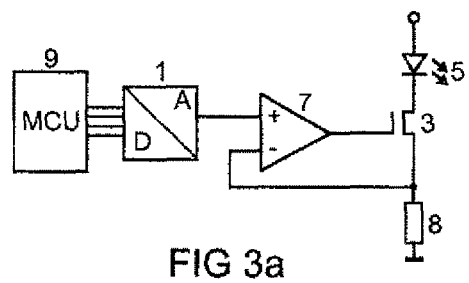

FIG. 3a application circuit of an implementation of the control method according to the invention.

Figure 3B:
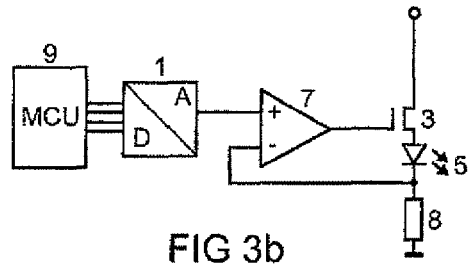

FIG. 3b alternative application circuit of an implementation of the control method according to the invention.

Figure 4:
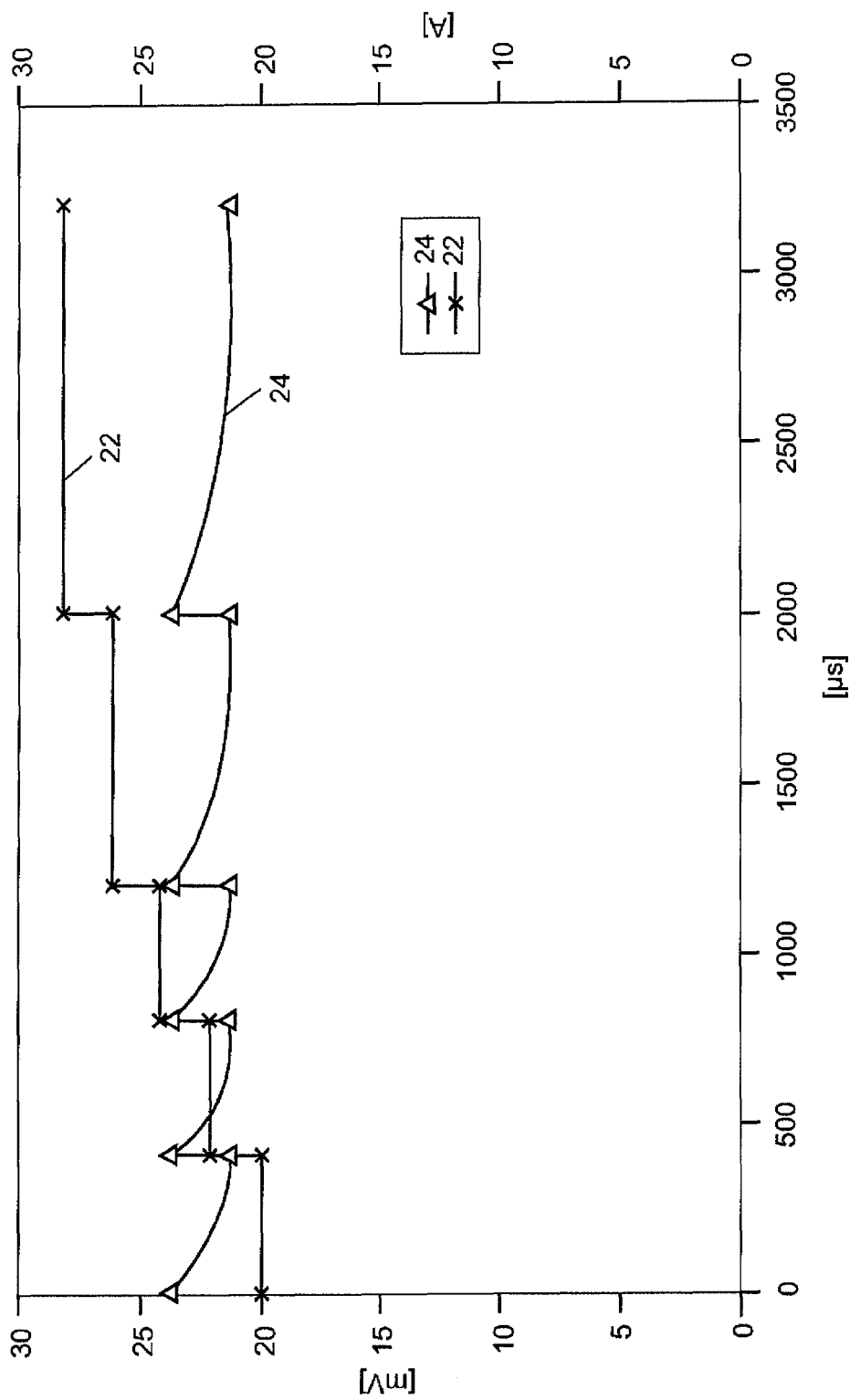

FIG. 4 light emitting diode current 22 and luminous flux 24 over time according to the control method according to the invention.

DETAILED DESCRIPTION

The following detailed description refers to the accompanying drawings that show, by way of illustration, specific details and embodiments in which the invention may be practiced.

FIG. 1 shows the measurement of the light emission of a light emitting diode that emits red light during a pulse. It can clearly be discerned that the luminous flux 23 of the light emitting diode decreases quickly within the pulse duration. This is attributable to the high degree of heating of the light emitting diode chip during the pulse duration. Since this heating takes place during such a short time, a control method according to the prior art, the basis of which is normally the heat sink temperature, cannot be effective. Since the current consumption practically remains constant during the entire pulse, but the light emission decreases, more and more energy is converted into heat instead of light. This has the effect that the efficiency of the light emitting diode decreases further, and the light emission decreases to a greater extent. Since the light emitting diode can cool down sufficiently again in the pulse pauses, the loading of the light emitting diode is within the specifications. However, the light decrease within the pulse is undesirable and leads to impairment of the picture quality.

The light emission over time follows an exponential function and can be represented by the following equation:

$$y = y_0 + A * e^{-\frac{t}{t_0}}$$

In the present case of a light emitting diode that emits red light, the light emission is represented by the following values:

| $y_0$ | A | $t_0$ |
|---|---|---|
| 12.7 | 11.0 | 1642.7 |

These values produce the curve 27 in FIG. 2, which deviates only slightly from the measured profile 25. As soon as the light profile is known, the luminous flux decrease can be counteractively controlled by means of a feedforward control.

FIG. 3 shows by way of example a circuit construction with which the control method according to the invention can be realized. A digital/analog converter 1 converts the predefined current value output by a control circuit (9) into an actual current value for the light emitting diode 5 by means of a comparator 7 and the series control transistor 3. It is also possible, of course, for a plurality of light emitting diodes to be connected in series. The light emitting diode itself can be situated at different locations in the current path, as can be gathered from FIGS. 3*a* and 3*b*. The digital/analog converter can, of course, also be integrated in the control circuit (9). The shunt 8 serves for generating the actual current value for the comparator 7. According to the invention, then, the control circuit (9) does not predefine a constant current value during the pulse, but rather a current value that rises in such a way that the luminous flux of the light emitting diode remains constant during the entire pulse duration. By virtue of the fact that the characteristic light decrease of the light emitting diodes is stored in the control circuit, the latter can generate a predefined current value in the case of which the emitted quantity of light of the light emitting diode substantially remains constant over the entire pulse duration.

In order to comply with different current intensities and different initial temperatures, the characteristic light decrease can be stored as a family of characteristic curves in the control circuit.

In order to save storage space in the control circuit, however, it is also conceivable for the characteristic light decrease to be stored as a mathematical relationship in the control circuit, and for the predefined current value to be respectively calculated from the mathematical relationship with the aid of the relevant measurement variables. A mixed form is also conceivable, however, in which auxiliary values derived from the relevant measurement variables are stored in a table and the predefined current value is calculated with the auxiliary values and a stored mathematical relationship.

The result of this procedure is shown once again by way of example for a red light emitting diode in FIG. 4. Here the predefined current value and thus the light emitting diode current 22 changes during the pulse duration, such that the resulting light emission of the light emitting diode or light emitting diodes substantially remains constant during the entire pulse duration. A control according to the prior art wherein the power introduced into the light emitting diodes is dependent on the heat sink temperature can be superposed on the feedforward control. In this way, the long-term decrease in the light can also be corrected.

It goes without saying that the control method according to the invention can also be used for any other semiconductor light source, such as an OLED for example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A control method for a semiconductor light source using a circuit arrangement for operating a semiconductor light source, wherein the semiconductor light source is operated with short and powerful pulses by the circuit arrangement, the circuit arrangement comprising:
   a control circuit;
   a digital/analog convertor;
   a comparator;
   a transistor;
   wherein the control circuit is configured to input, via the digital/analog convertor, a desired predefined current value into the comparator, the output of which in turn is connected up to the input of the transistor and which impresses a current corresponding to the desired predefined current value into the semiconductor light source;
   wherein the control circuit is configured to store the characteristic luminous flux decrease of the semiconductor light source, and wherein the control circuit is configured to alter the power introduced during the pulse such that the emitted quantity of light of the semiconductor light source substantially remains constant over the pulse duration,
   the method comprising:
   operating the semiconductor light source with short and powerful pulses by an operating device;
   storing the characteristic light decrease of the semiconductor light source depending on the power introduced into the semiconductor light source in the operating device;
   and altering power introduced during the pulse such that the emitted quantity of light of the semiconductor light source substantially remains constant over the pulse duration.

2. The control method as claimed in claim 1, wherein the characteristic light decrease is stored in the form of a family of characteristic curves.

3. The control method as claimed in claim 1, wherein the characteristic light decrease is stored in the form of a mathematical formula.

4. A circuit arrangement for operating a semiconductor light source, wherein the semiconductor light source is operated with short and powerful pulses by the circuit arrangement, the circuit arrangement comprising:
   a control circuit;
   a digital/analog convertor;
   a comparator;
   a transistor;
   wherein the control circuit is configured to input, via the digital/analog convertor, a desired predefined current value into the comparator, the output of which in turn is connected up to the input of the transistor and which impresses a current corresponding to the desired predefined current value into the semiconductor light source;
   wherein the control circuit is configured to store the characteristic luminous flux decrease of the semiconductor light source, and wherein the control circuit is configured to alter the power introduced during the pulse such that the emitted quantity of light of the semiconductor light source substantially remains constant over the pulse duration.

5. The circuit arrangement as claimed in claim 4, wherein the analog/digital converter is integrated into the control circuit.

6. The circuit arrangement as claimed in claim 4, wherein the control circuit contains a microcontroller.

7. The circuit arrangement as claimed in claim 4, wherein the control circuit contains a digital signal processor.

* * * * *